Oct. 4, 1955  G. SLAYTER ET AL  2,719,352
METHOD FOR HANDLING CONTINUOUS STRANDS AND THE LIKE
Filed Aug. 20, 1953  9 Sheets-Sheet 1
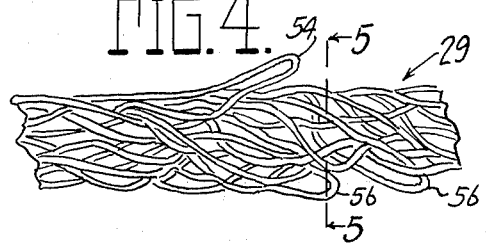
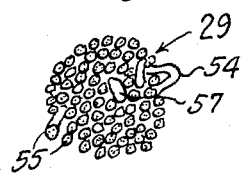
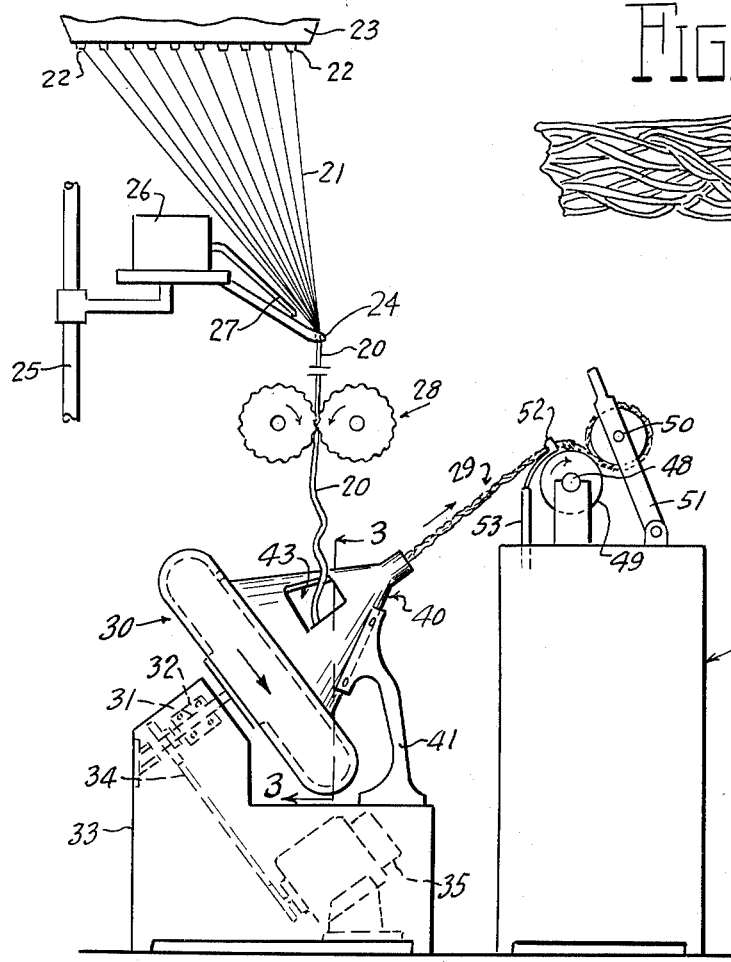
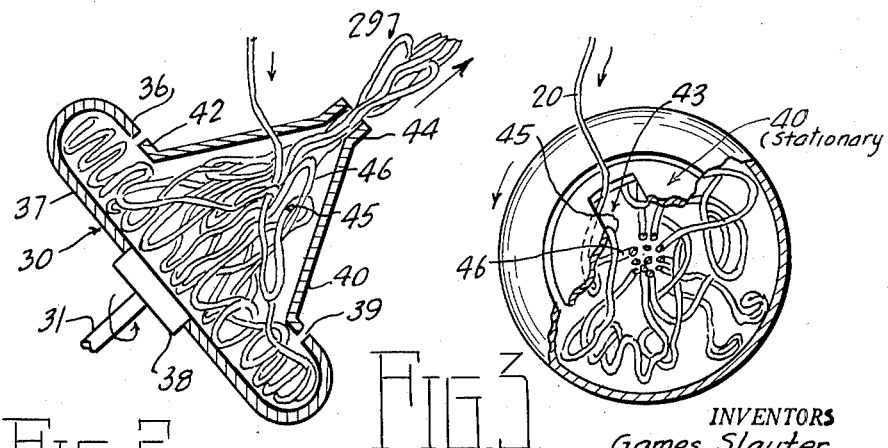
INVENTORS
Games Slayter
BY Warren Wendell Drummond
Staelin and Overman
ATTORNEYS Oct. 4, 1955   G. SLAYTER ET AL   2,719,352
METHOD FOR HANDLING CONTINUOUS STRANDS AND THE LIKE
Filed Aug. 20, 1953   9 Sheets-Sheet 2

INVENTORS
Games Slayter
BY Warren Wendell Drummond
Staelin and Overman
ATTORNEYS

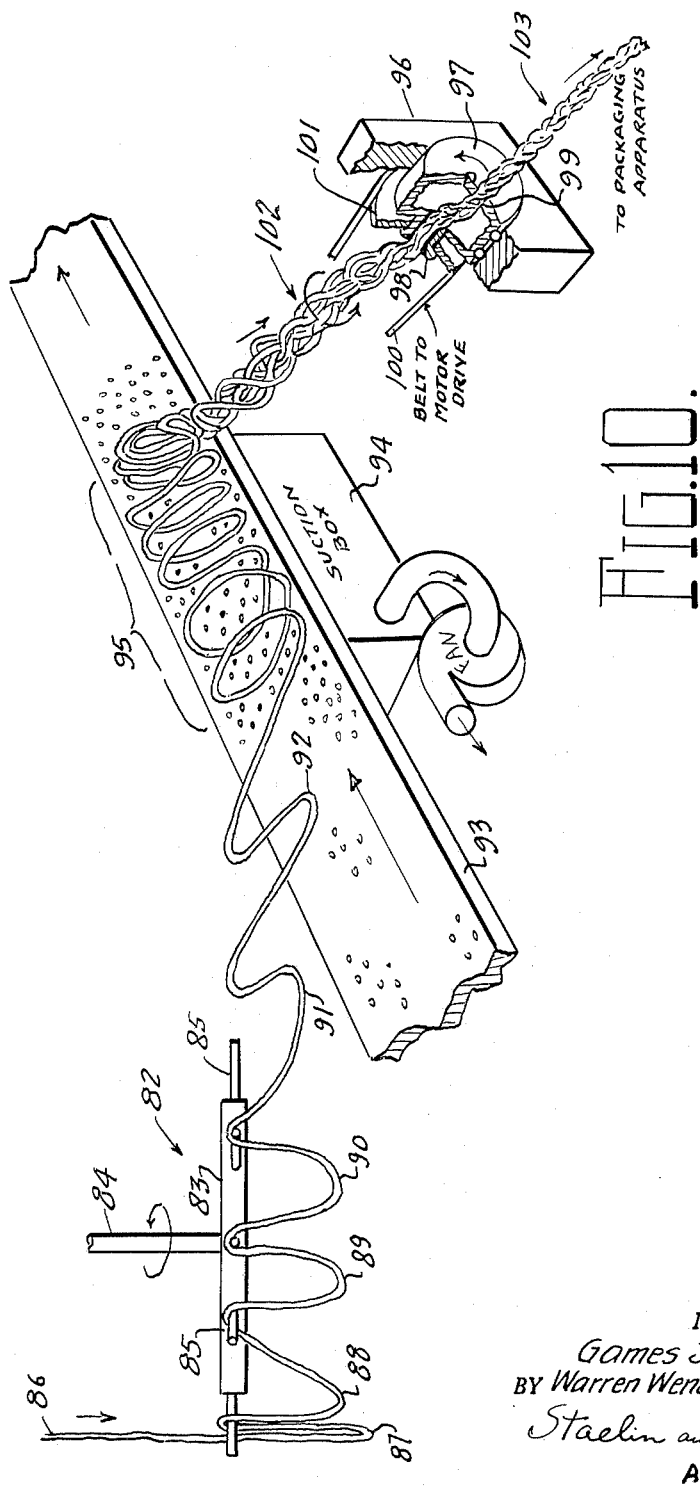

Oct. 4, 1955 G. SLAYTER ET AL 2,719,352
METHOD FOR HANDLING CONTINUOUS STRANDS AND THE LIKE
Filed Aug. 20, 1953 9 Sheets-Sheet 4
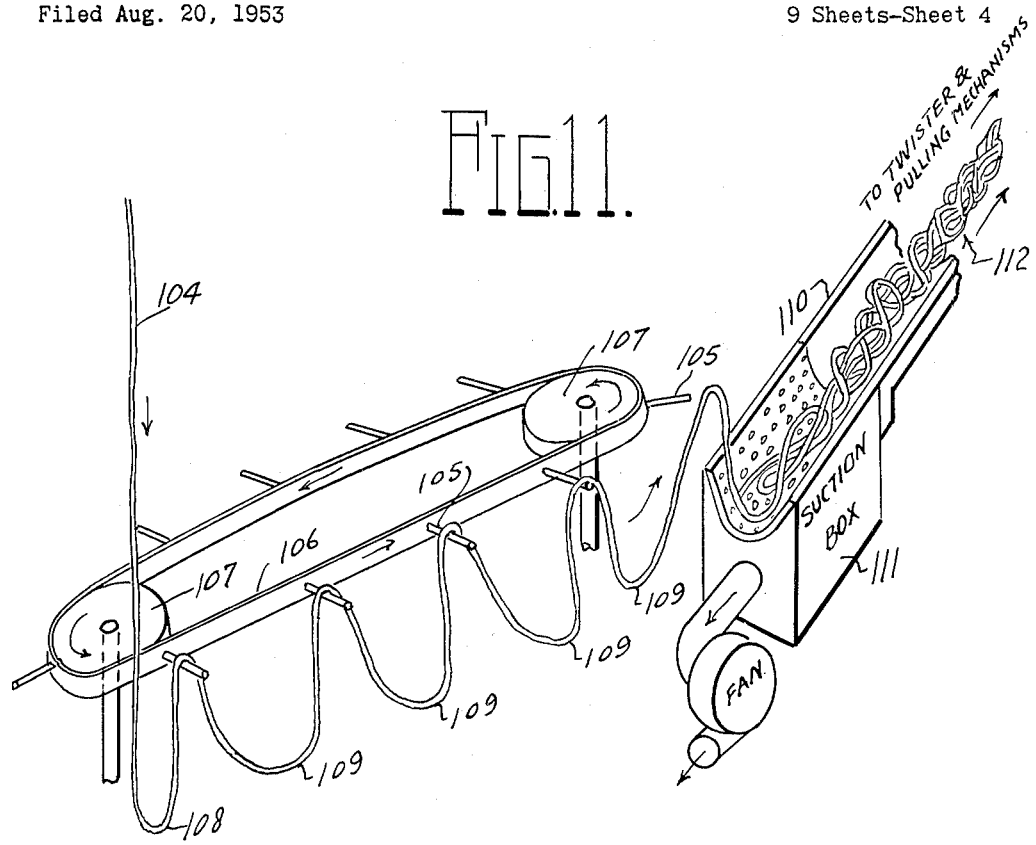
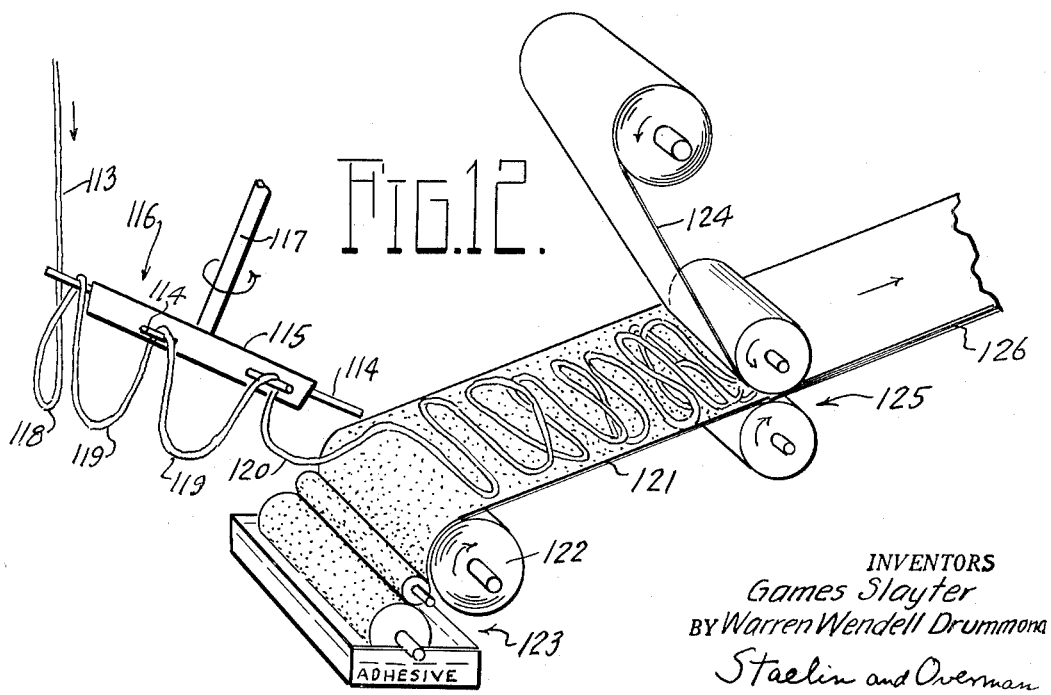
INVENTORS
James Slayter
BY Warren Wendell Drummond
Staelin and Overman
ATTORNEYS Oct. 4, 1955  G. SLAYTER ET AL  2,719,352
METHOD FOR HANDLING CONTINUOUS STRANDS AND THE LIKE
Filed Aug. 20, 1953  9 Sheets-Sheet 6

Inventors
*Games Slayter*
*Warren Wendell Drummond*

By *Staelin and Overman*

Attorneys

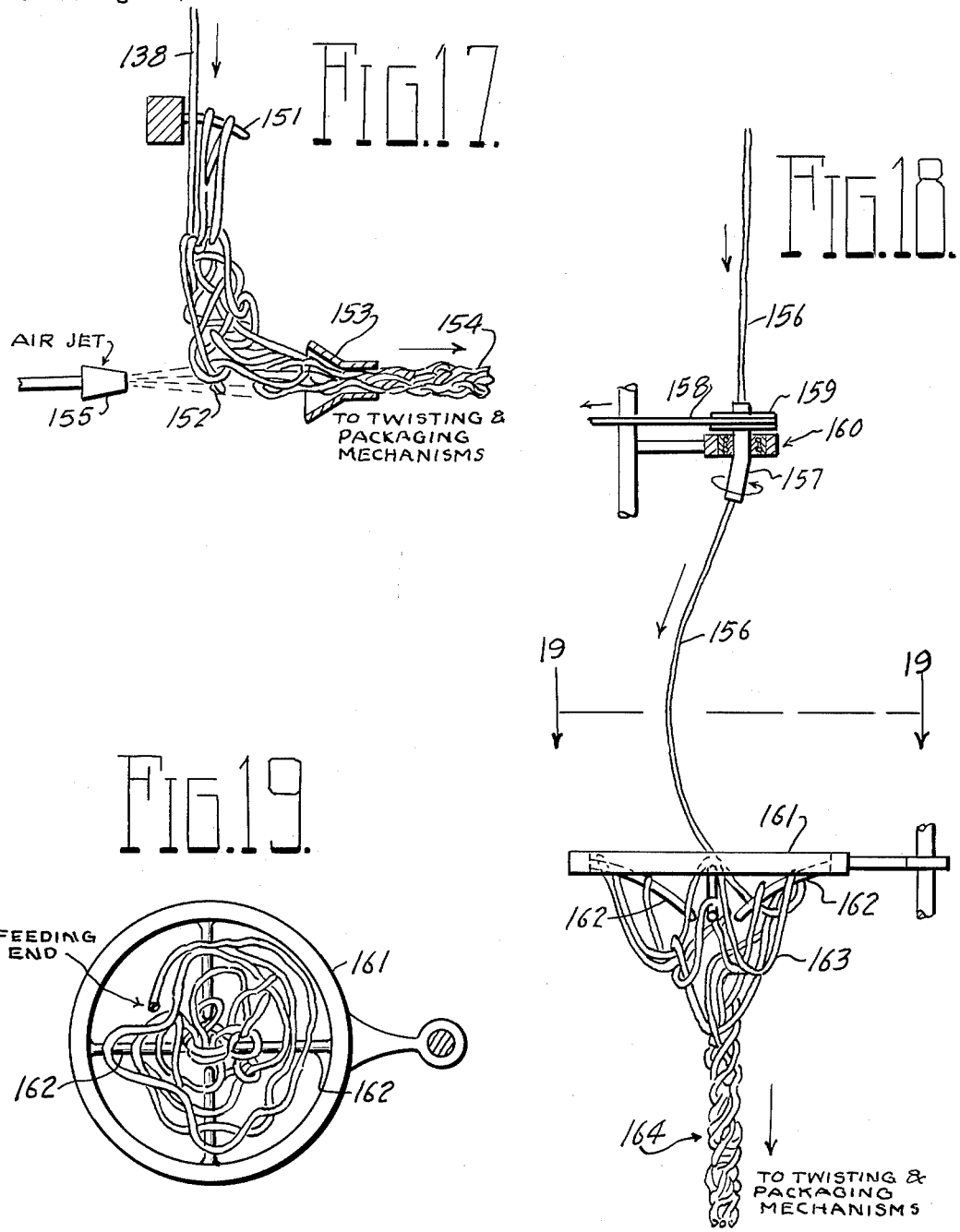

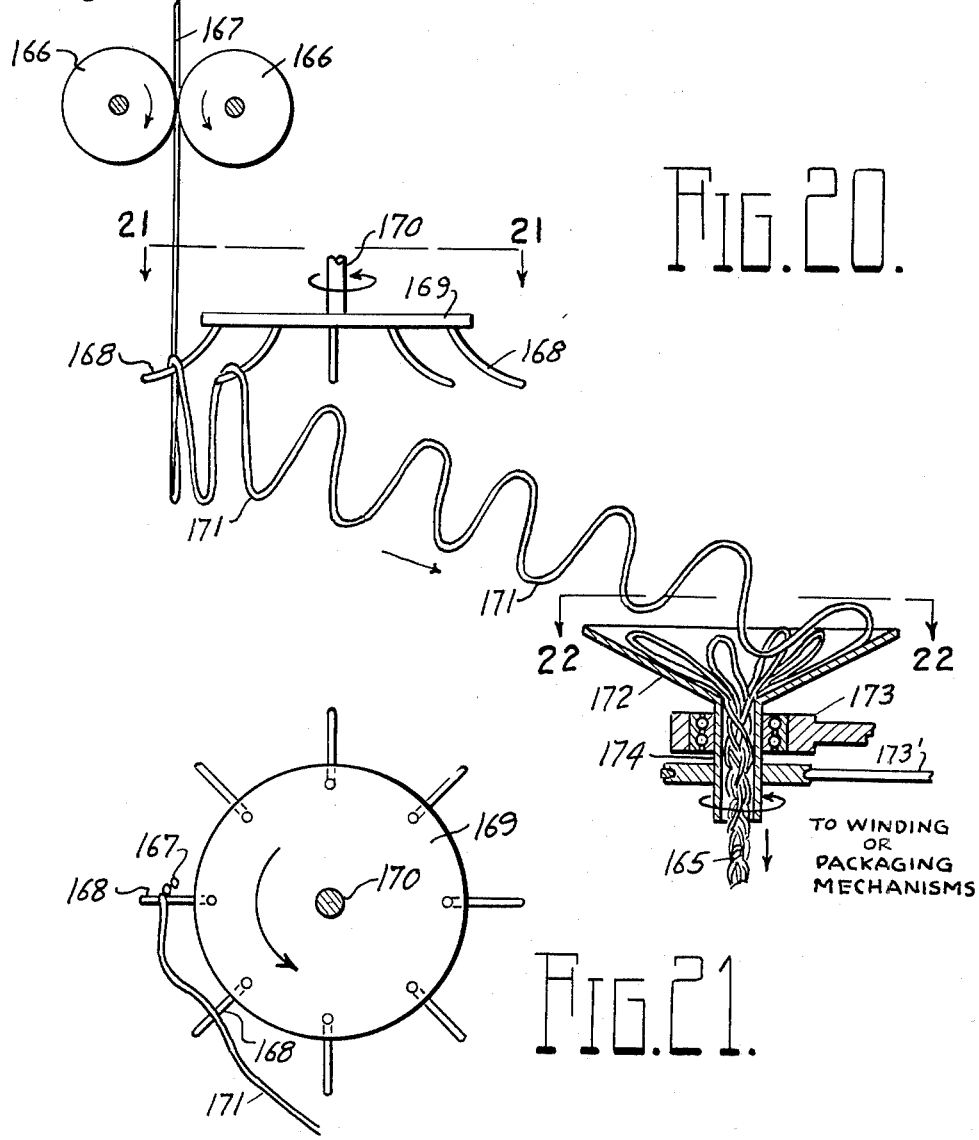
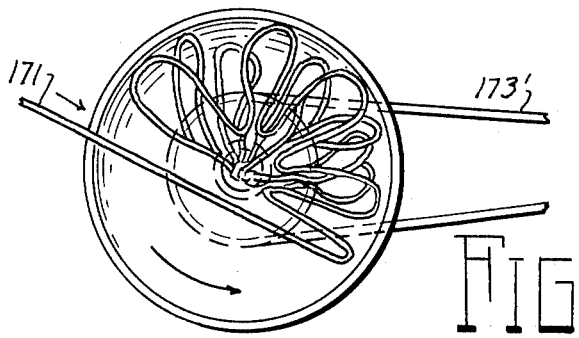

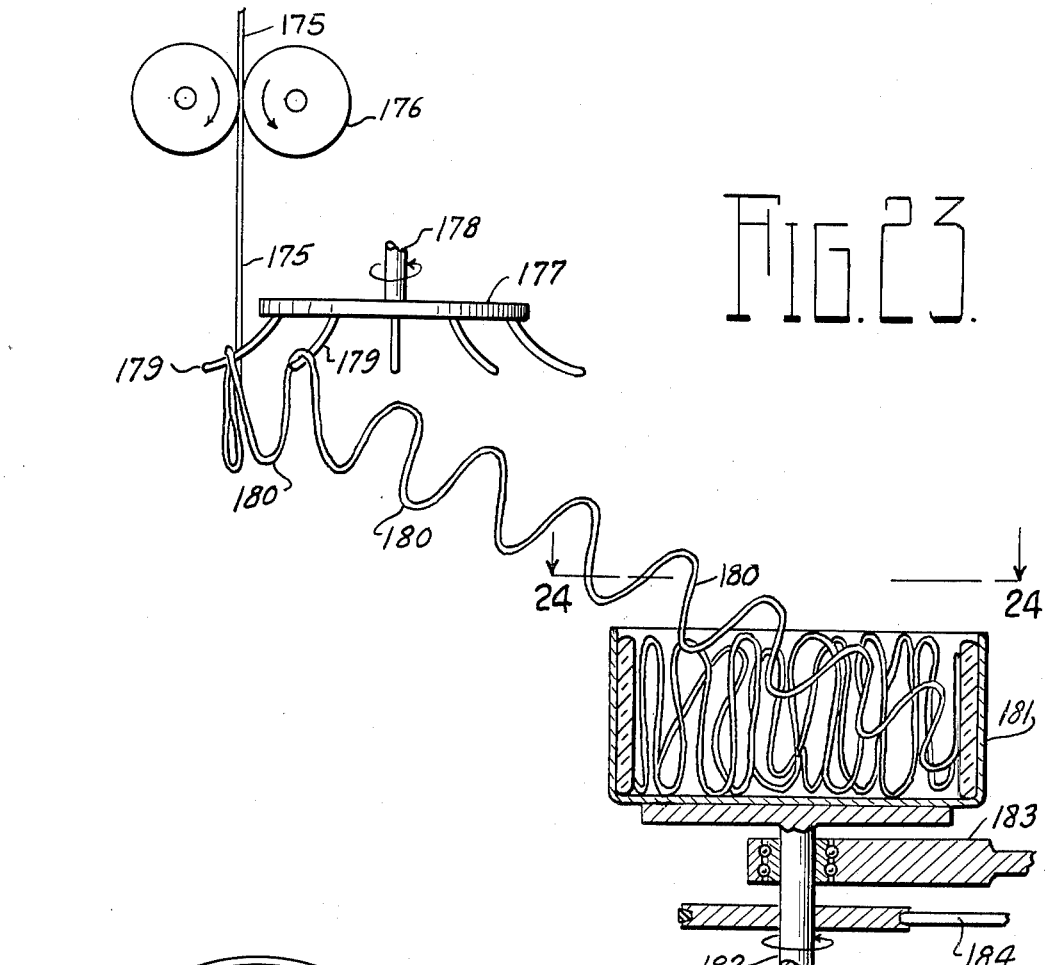
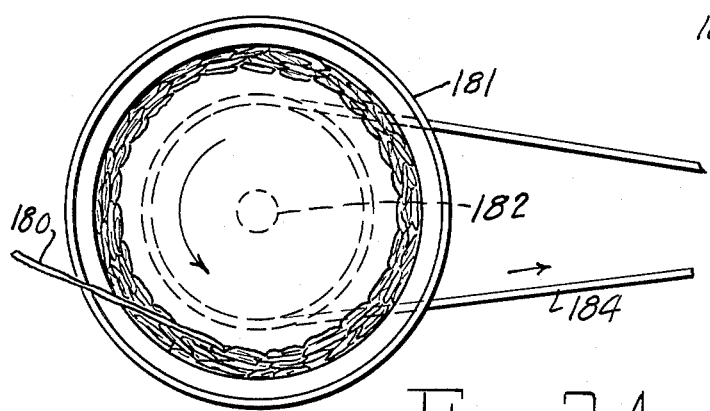

United States Patent Office 2,719,352
Patented Oct. 4, 1955

2,719,352

METHOD FOR HANDLING CONTINUOUS STRANDS AND THE LIKE

Games Slayter, Newark, Ohio, and Warren Wendell Drummond, Anderson, S. C., assignors to Owens-Corning Fiberglas Corporation, Toledo, Ohio, a corporation of Ohio Application August 20, 1953, Serial No. 375,464

17 Claims. (Cl. 28—72)

This invention relates to a method for handling continuous strands. Where a continuous strand, filament or similar elongated object is produced or made available at a high linear rate of speed it is difficult to package the strand or fabricate end products from the strand because of the impossibility of adequately handling the strand at its extremely high rate of production.

For example, in the manufacture of glass fiber strands, a strand composed of, say, 200 individual filaments may be pulled from streams of molten glass at a linear rate in excess of 10,000 feet per minute. In production a strand being created at this high speed can be accumulated in subsequently usable form only by being wound upon a high speed rotary spool or bobbin type package, with the consequent difficulties in subsequent handling which arise from the tension built up on the rotating package and from the necessity for unwinding the strand in order to combine it with other strands for the formation of threads and yarns or bundles of strands.

It is the principal object of this invention to provide a process whereby a single strand which is produced or made available at an excessively high speed, in the order of that mentioned, can be continuously doubled or piled up upon itself during handling so that the ultimate speed of the accumulated mass can be reduced in ratio to the doubling up or accumulating, and thus directly handled for packaging or end uses without the steps of first winding and then unwinding the strand.

In considering the process embodying the invention the term "strand" is to be understood as including multiple filaments associated together in parallel or generally parallel relationships to form what might be termed groups or bundles of filaments, single heavy filaments, threads or yarns formed from filaments or from groups of filaments, and in general is only limited by the fact that the material must be relatively flexible and is intended to be continuous to the extent that during practical normal operation the material is continuously supplied either by manufacture at the time of operation or from a source of such material.

The invention contemplates the provision of a step of intermittently slowing spaced portions of the strand being handled or even momentarily stopping longitudinally spaced portions of the strand, so that intervening portions of the strand are allowed to double up upon themselves or to catch up with the intermittently or momentarily delayed spaced portions of the strand, including those delayed previously to the portions under consideration.

The invention contemplates that the longitudinally spaced portions of the strand which are to be delayed or momentarily stopped may be spatially isolated from each other at the time of delay or momentary stopping; or they may be stopped by a continuous instrumentality so positioned and moved that the intervening portions of the strand connecting these handled portions shall arrive at the same locality or may even bypass the delayed portions between successive delayed spaced portions.

It is well known that a long length of rope, for example a clothesline or a lariat to be compacted for easier handling, may be coiled or looped back and forth upon itself. Long lines such as those used on sailing vessels are thus coiled and looped upon themselves by being wrapped back and forth on cleats or "belayed," in the nautical terminology.

This invention includes in its principal object the provision of a continuous mechanical process for the doubling up of a continuous strand in loops, coils or swirls and wherein at least one end of each loop is momentarily grasped and then released in timed sequence so that the strand is doubled up upon itself and, depending upon the timing and nature of the grasping and releasing, may be directly made into a final product previously requiring intermediate winding and unwinding steps.

The nature of the process and mode of achieving the doubling up of the strand upon itself to reduce its linear speed and to make it available for direct handling will be better understood by reference to the specification which follows and from the drawings in which:

Fig. 1 is a somewhat schematic view, in elevation and on a small scale, of apparatus designed for carrying out one modification of the process embodying the invention.

Fig. 2 is an enlarged vertical sectional view illustrating the doubling up process as performed in apparatus as shown in Fig. 1.

Fig. 3 is a view taken substantially on the line 3—3 of Fig. 1.

Fig. 4 is a fragmentary greatly enlarged view in elevation of a doubled up "roving" consisting in a multiplicity of strand loops intertangled and intertwined with each other.

Fig. 5 is a vertical sectional view taken substantially on the line 5—5 of Fig. 4.

Fig. 10 is a somewhat diagrammatic view in perspective of yet another modification of the process of the invention as performed on different apparatus.

Fig. 11 is a perspective view similar to Fig. 10 but illustrating a further modification in the process of the invention and as employed with still other apparatus designed to carry out the method.

Fig. 12 is a view in perspective illustrating the reinforcement of continuous webs of paper by a continuous strand handled in accordance with the invention to double it up upon itself and permit its direct application to the paper being reinforced.

Fig. 17 is a vertical sectional view taken substantially on the line 17—17 of Fig. 16.

Fig. 18 is a simplified view in elevation of yet another modified apparatus operating according to the invention.

Fig. 19 is a plan view taken substantially from the position indicated by the line 19—19 in Fig. 18.

Fig. 20 is a view in elevation illustrating yet another modification of apparatus which may be operated according to the invention for the production of a roving-like mass.

Fig. 21 is a fragmentary sectional view taken substantially on the line 21—21 of Fig. 20.

Fig. 22 is a view similar to Fig. 1 but taken on the line 22—22 of Fig. 20.

Fig. 23 is a view similar to Fig. 20 but of yet another modification in which the process of the invention is employed for packaging a continuously produced strand.

Fig. 24 is a fragmentary sectional view taken substantially on the line 24—24 of Fig. 23.

Figure 6:
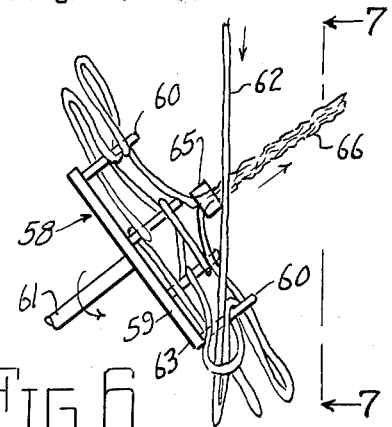
Fig. 6 is a fragmentary detailed view of another modification of the invention employing different apparatus for carrying out the process constituting the invention.

For purposes of illustration through the specification, the continuous strand being handled will be assumed to be a continuously produced glass fiber strand. It is, of course, to be appreciated that the process of the invention is not limited to the handling of glass fiber strands and any other continuous strand produced or made available at a high lineal speed may similarly be accumulated and doubled up upon itself to facilitate its direct concurrent handling without the intervening steps of winding and unwinding as practiced in the art in general.

Operation according to the invention consists in so handling a continuous strand that it is looped and doubled upon itself to form a continuous series of connected bights, each of which may be separately formed and handled to properly associate it with both those previously and those subsequently formed.

In Fig. 1 there is illustrated the production and handling of a glass fiber strand 20 which is continuously formed by pulling a multiplicity of individual fibers 21 from streams of glass pouring through orifices 22 on the bottom of a molten glass tank or melter 23. The fibers 21 are associated together by being led over a guide 24 supported from a bracket 25. The bracket 25 also supports a tank 26 having a drip spout 27 for the application of a suitable sizing or adhesive to the guide 24 for transfer to the fibers 21 as they are associated into the strand 20. Many different types of sizes and coatings may thus be applied, including simply a thin coating of water, the surface tension of which tends to hold the associated fibers 21 together in the strand 20.

The fibers 21 are pulled from the streams of glass by leading the strand 20 between a pair of pulling rollers generally indicated at 28 which may be provided, for example, with resilient peripheries having intermeshing configurations or with other peripheries suitably designed to exert tractive force on the strand 20. The speed of pulling of the strand 20 depends of course upon the speed of rotation of the pulling wheels 28 and is limited solely by mechanical consideration in the speed of rotation of the wheels 28 and proper temperature and constituents of the glass. Such a glass fiber strand may be pulled by coacting pulling wheels at speeds in the order of 10,000 or 11,000 feet per minute.

The pulling wheels 28 project the strand 20 in a substantially straight line path and at such a rate that the strand travels through the atmosphere for a distance of, say, five to six feet arriving at the end of its path with an impetus considerably in excess of that achieved by merely a free fall between the pulling rollers 28. The impetus of the strand is relied upon to a certain extent in some modifications of the invention to achieve compactness in the intermediate positions of the strand between its projection from the pulling wheels 28 and its final accumulation after handling. Of course, operating at speeds in the order of those stated, the strand 20 will always have a speed and impetus far in excess of that achieved by free fall at any normal operating distance away from the pulling wheels 28.

Unless otherwise specified, throughout the remainder of the specification it will be assumed without further description that the strand being handled is formed and pulled in each instance in a manner similar to that illustrated in Fig. 1.

Located at a suitable operating distance beneath the pulling wheels 28 there is shown in Fig. 1 mechanism for directly accumulating the strand upon itself and packaging the strand in the form of a multi-strand "roving" generally indicated at 29. The apparatus for accumulating the strand upon itself as illustrated in Fig. 1 comprises a rotating annular catcher 30 which is mounted upon an inclined spindle 31 angled upwardly at the path of movement of the strand 20 and spaced laterally therefrom. The spindle 31 is mounted for rotation by bearings 32 near the top of a housing 33 and driven by a belt 34 engaged in the pulley of a motor 35.

The catcher 30 (see also Fig. 2) is a hollow generally torus shape container having return lips 36 and 37. The bottom return lip 37 continues inwardly toward the axis of the catcher 30 and mounts the catcher 30 upon a hub 38 of the spindle 31. The return lip 36 is radially short and leaves a centrally located opening 39 in the upper face of the catcher 30. A funnel shaped stationary hood 40 is mounted, for example, on a bracket arm 41 on the housing 33, and has a peripheral flange 42 which fits inside the lip 36 of the rotating catcher 30. The hood 40 has an opening 43 cut through its wall in line with the path of projection of the strand 20 from the pulling wheels 28. The hood 40 has a neck 44 at its upper end of reduced diameter, the neck 44 extending generally coaxial with the axis of rotation of the catcher 30 and the shaft 31. It will be observed particularly in Fig. 3 that the vertical line of the opening 43, i. e., the pathway of the strand 20, is spaced laterally relative to the axis of the hood 40 and catcher 30.

When the pulling wheels 28 project the strand 20 downwardly it enters the hood 40 through the opening 43 and, at least at the beginning of an operation, impinges upon the interior generally cylindrical surface of the catcher 30 between its lips 36 and 37. The catcher 30 is rotated so that the linear speed of the inner surface thereof is substantially less than the lineal speed of the strand 20. The ratio between the lineal speeds of the surface of the catcher 30 at the point of impingement of the strand 20 thereon and the strand 20 itself is selected to allow the strand 20 to fall on the surface of the catcher 30 in successive wave, loop and swirl formations which, if continued without interruption, would result in building up upon the interior surface of the catcher 30 a mass of helical generally wave form layers of the strand 20.

Because of the slower speed of the surface of the catcher 30, the strand 20 is delayed at each lateral bight in the loops and swirls until the intervening connecting lengths of the strand fall on the surface of the catcher 30.

In operating according to the invention, however, an operator reaches through the neck 44 with a suitable instrument such as a long hook and catches hold either of a loop of the strand 20 or of a portion of one of the loops or waves of the strand which has fallen on the surface of the package 30. He then withdraws this loop outwardly through the neck 44 of the hood 40. As soon as a length of the strand has been drawn upwardly into the neck 44 of the stationary hood 40, the continuing rotation of the catcher 30 swings the strand length around passing it repeatedly across the path of projection of the continuous strand 20 so that it strikes the strand 20, laterally deflecting the strand and causing it to loop over the portion being pulled out the neck 44. Each of the doubled or looped over portions of the continuous strand entangles with looped over portions and doubled sections previously projected into the hood 40 and lying on the surface of the catcher 30 so that almost at once a generally conical shaped web work of the strand doublings and lengths is being pulled inwardly and upwardly along the converging pathway established by the hood 40 and out of the neck 44.

The speed at which the entangled mass is pulled out of the neck 44 to form the roving 29 determines the ratio between the number of strands at any cross section of the roving 29 and unity, i. e., the single strand 20 being projected into the hood 40.

Fig. 4 illustrates how the loops and doublings of strand are intertangled and intermatted with each other by the process just described and Figs. 2 and 3 show an illustrative entanglement during the process of its formation. In Figs. 2 and 3 it will be observed how the continuous strand 20 has looped over, as at 45, having been interrupted by and caught upon a length of strand 46 extending generally upwardly and into the neck 44 of the hood 40. Because of the rapidity of rotation of the catcher 30 such entanglements and loopings occur very rapidly and repeatedly so that the loops and doublings of the strand are completely entangled and thus apply considerable tractive force to each other.

Passage of the entangled mass of loops, doublings or bights of strand through the neck 44 laterally compacts the mass and loosely holds it against rotation so that the continuous rotation of the catcher 30 twists the lengths of strand together.

In order to produce a commercially satisfactory roving 29 having relatively uniform characteristics it is necessary that the pulling force on the roving 29 be with continuous force and speed. Fig. 1 illustrates, therefore, the employment of a conventional surface traction winder 47 which is provided with a driven spindle 48 mounting a tractive surface roller 49 over which the roving 29 is led en route to a winding spindle 50. The winding spindle 50 is rotatably mounted upon a pivotal frame 51 so that it can be swung forwardly into surface contact with the roller 49 to impart rotation to the spindle 50 and to the accumulating mass of roving thereon. A guide eye 52 mounted on the upper end of an arm 53 is reciprocated axially to lead the roving back and forth across the accumulating package so that the wind of the package is open and its surface maintained generally cylindrical.

At any point along the roving 29 a cross section as illustrated in Fig. 5 shows constant average number of strands in compacted relationship. The number of strands found will be equal to the ratio between the lineal speeds of the strand 20 and the roving 29.

Referring again to Figs. 4 and 5 it will be observed that where the cross section of Fig. 5 is taken there may be visible a loop 54 extending laterally out of the general mass of the roving 29 and there may be ends 55 extending outwardly from the general mass by reason of a loop 56 having been cut off at the cross section point. Similarly, in the interior of the mass of the roving 29 at any point a loop end 57 may be seen. The presence of the variable elements along the roving 29 is unimportant commercially as long as the average number of strands at any point is maintained. The roving 29, for example, is entirely suitable for subsequent chopping into short lengths, say, of one-half inch or longer for use in reinforcing resinous articles or in the formation of mats of chopped fibers for cushioning and insulation purposes. When the fibers are chopped it is impossible to determine whether they had been formed from the roving 29 of intertangled progressively spaced loops and doublings or from a roving of the type previously fabricated wherein a large number, say, 80 individual strands were led into general parallelism and then either twisted or directly packaged in roving form.

It will be observed also in Fig. 4 and results, of course, from the rotation of the catcher 30 that the roving 29 has imparted to it a definite twist which is a "real" twist insofar as its remaining in the roving 29 when tension thereon is changed. The twist in the roving 29 further tends to intertangle and compact the individual strands making up the roving 29 thereby permitting the roving 29 to be successively unwound from the package and handled during subsequent operations at other locations.

Figure 7:
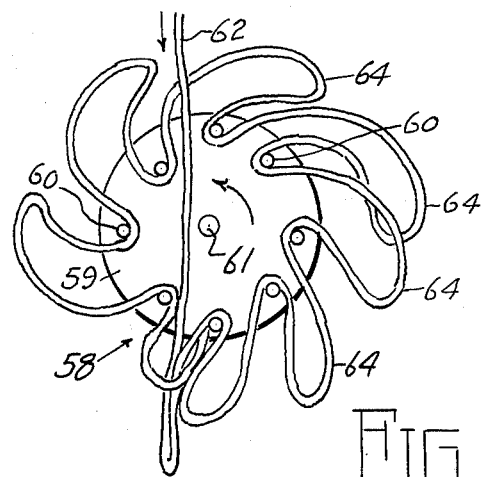
Fig. 7 is a view taken substantially on the line 7—7 of Fig. 6.

The concept of the invention in the doubling up of the strand upon itself as achieved in the mechanism of Figs. 1–3 may also be carried out upon different types of mechanism. Figs. 6 and 7 illustrate such a process also for the formation of an intertangled and intermatted roving. In the operation according to Figs. 6 and 7 a peg spinner generally indicated at 58 and comprising a disk 59 having a plurality of generally axially extending pegs 60 is mounted upon an inclined rotary shaft 61.

The axis of the shaft 61 is inclined upwardly toward and spaced laterally from the line of movement of a continuously produced strand 62. The path of movement of the strand 62 intersects the path of movement of the pegs 60 at a point relatively close to the disk 59. Thus the strand 62 being projected linearly downwardly is intermittently engaged by the rotating spaced pegs 60 and the spaced engaged portions of the strand 62 are halted momentarily, allowing the continuous strand to bend over the pegs 60 being engaged and to continue downwardly forming loops 63. As can best be seen by reference to Fig. 7 as soon as the peg spinner 58 has rotated through one rotation there is a loop 64 extending between each adjacent pair of pegs 60. Because of the resistance of air to the passage of the loops 64 therethrough the loops 64 trail behind the pegs 60 over which they are engaged.

As the peg spinner 58 continues to rotate and the continuous strand 62 continues to be driven downwardly, it frequently is engaged by and loops over portions of the loops 64 rather than the pegs 60. During continued rotation this further entangles loops and doublings of the strand with each other.

A guide eye 65, functionally corresponding to the neck 44 of Fig. 2, is mounted in a position generally in line with the axis of the peg spinner 58 and axially spaced a little beyond the plane of the ends of the pegs 60. As was the case with the operation of the Fig. 2 apparatus an operator reaches through the guide eye 65 and hooks a portion of the strand to initiate the formation of a twisted intermatted roving 66. As the roving 66 is pulled out of the guide eye 65, lengths of strand being pulled from between the pegs 60 extend angularly outwardly from the guide eye 65 and thus are rotated around repeatedly cross the path of the projected strand 62 and catching loops and doublings of the projected strand. Each such entanglement creates another doubling of the strand 62 and an entanglement of subsequently formed doublings with previously formed loops and lengths so that the mass progressively is drawn off the pegs inwardly and upwardly into the guide eye 65.

Each of the loops 64 may be considered as comprising two serially connected bights of strand and thus, when intertwined and entangled, the mass consists in a plurality of such bights all progressively interengaged.

It will be appreciated that the precise configurations illustrated in the drawings are not intended in any way to limit the showing but are merely illustrative of entanglements and formations actually occurring in operations according to the invention as observed. The precise formations taken by any sections of the strand during the operation according to the process is impossible to depict and, therefore, the shapes shown are to be understood as only generally indicative of the action taking place.

Figure 8:
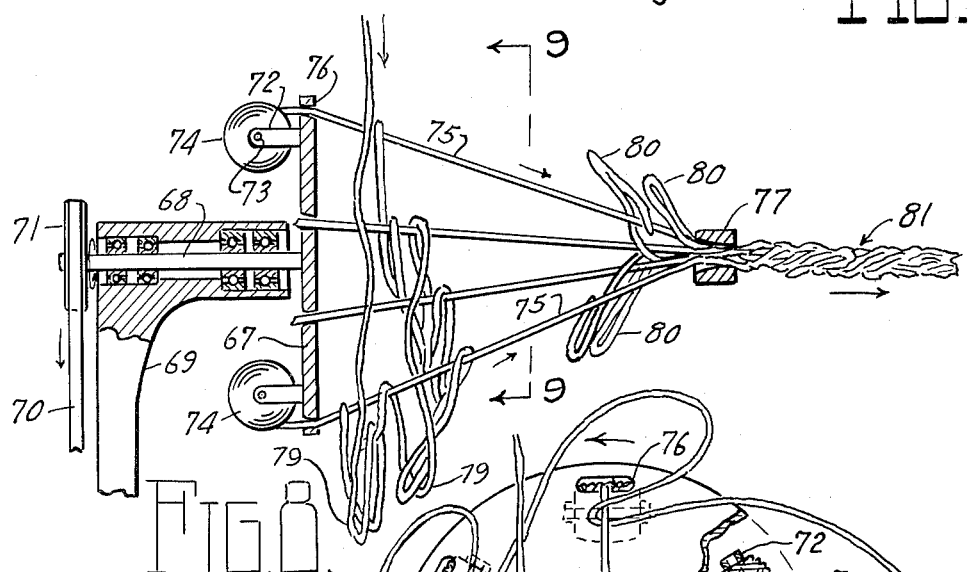
Fig. 8 is a somewhat schematic vertical sectional view, with parts broken away, of yet another mechanism for carrying out a modified process according to the invention.
Figure 9:
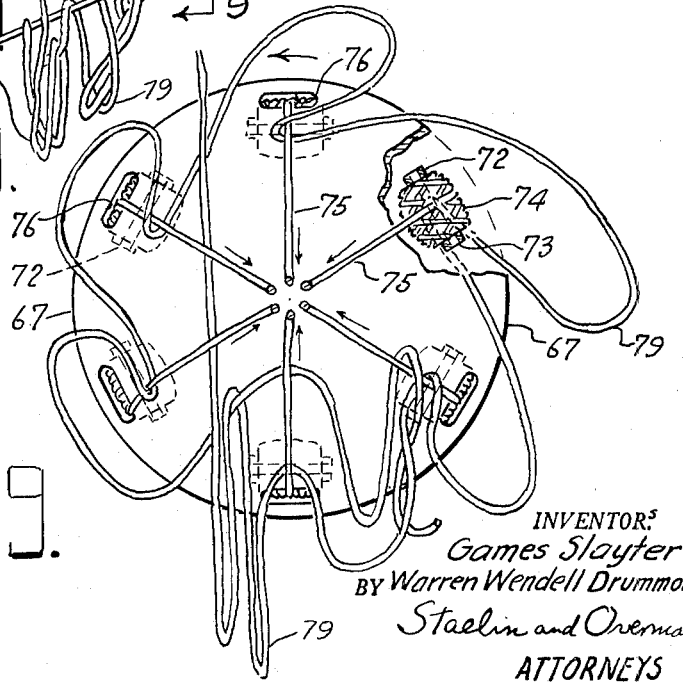
Fig. 9 is a view taken substantially on the line 9—9 of Fig. 8.

Figs. 8 and 9 illustrate yet another operation according to the invention wherein a plurality of continuous strands are intertwined with the doublings and entangled single strand to provide increased tensile strength in the finished roving-like material and to bulk up the finished product or for other purposes such as intermingling different materials wherein the continuous strands may, for example, be formed of one material and the single continuous strand to be doubled may be formed of another material.

In operating according to Figs. 8 and 9 a rotary plate 67 is mounted upon one end of the shaft 68 which is journalled in an upright pedestal or post 69. The shaft 68 and plate 67 are rotated by the belt 70 engaged in a pulley 71 secured on the shaft 68. The plate 67 has a plurality of pairs of arms 72 mounted near its periphery and its back face. Each of the pairs of arms 72 mounts a spindle 73 which lies in a plane parallel to the face of the plate 67 and carries a spool or package 74 containing a substantial length of a single filament, strand, ribbon or cord 75. Although Fig. 8 illustrates only two of the spools 74 in place there may be more than two spools 74 near the periphery of the plate 67 and the balance are left out of Fig. 8 in order to prevent obstructing the view.

Each of the strands 75 (or other continuous elongated object similar thereto) is led through a guide opening 76 in the plate 67 and then along a path converging with the paths of the other strands 75 and, as a group, through a guide eye 77 axially spaced from the plate 67 and generally coaxial therewith. As the plate 67 is rotated and the strands 75 pulled therefrom through the guide eye 77, they are, of course, twisted upon each other and their lengths between the plates 67 and the guide eye 77 define a generally conical space.

A continuous strand 78 which may or may not be made of the same material as the strands 75 is projected downwardly along a generally straight line path to intersect the area delineated by the continuous strand 75 and it is intermittently struck by the continuous strands causing it to loop over the continuous strands as they are rotated across its path of movement, forming a plurality of loops 79 extending between the continuous strands 75 which loops 79 are gradually progressed with the moving strands 75.

In Figs. 8 and 9 only a few loops 79 are shown engaged on the individual strands 75 at the area near the plate 67 and a few loops indicated by the reference number 80 are shown as the strands 75 approach the guide eye 77. Centrifugal force created by rotation of the plate 77 tends to throw the loops 79 outwardly much like the loops in Figs. 6 and 7 and, consequently, as in the case of Figs. 6 and 7, the continuously fed strand 78 frequently is engaged by and loops over previously formed loops or sections of itself rather than directly over the feeding strands 75.

As the mass consisting of the loops and doublings formed over the continuously fed strands 75 and over sections of the projected strand 78 entangled therewith approaches the guide eye 77 it is laterally compacted and further entangled by the twisting of the several strands 75 upon each other and upon the looped lengths 80 intertwined therewith. Further pulling on the continuous strands 75 draws an intermatted, intertwisted, roving-like mass 81 out of the guide eye 77 which, in general appearance, is similar to the roving 29 illustrated in Figs. 4 and 5 except for the presence therein of the reinforcing or intermixed strands 75. In cross section, however, the roving 81 and the roving 29 of Fig. 5 may be indistinguishable of all of the strands are fabricated from the same material.

The process as illustrated in Figs. 8 and 9 contemplates not only the tensional strengthening of the finished roving 81 by the inclusion of longitudinally extending strands 75 and the intermixture of different types of fibers and materials, but it also includes the concepts of the substitution of an entirely different material for each of the strands 75 to incorporate such material with the fibers by being intertangled and intertwined therewith during the forming process. For example, the continuously projected strand 78 might be a glass fiber strand and the fed strands 75 might be small ribbons of a thermoplastic resin. The intertwining and twisting of the resin and glass strands together intermingles the two so that the roving 81 might be carried through heat or other treatment en route to the packaging device so as to fuse and set up the resin in the glass mass. The finished product in this case might be a resin bonded glass reinforced cord or heavy duty twine suitable for uses requiring tensile strength, bulk and toughness.

In the operation according to the invention as so far described, the bights of strand are individually formed but intertangled with other bights before or during removal from the strand interrupting elements. The modifications of Figs. 10 and 11 contemplates their removal before intertangling wherein each separately formed loop or doubling, consisting of two serially connected bights is separately removed from its forming means and thrown or led to a secondary bight entangling step. Variations of the steps in the process of the invention, however, do not depart from the concept of continuous formation of bights by interrupting spaced portions of the continuous strand.

In Fig. 10 there is illustrated a peg spinner 82 consisting in a disk 83 mounted upon a generally vertical rotary shaft 84 and provided with a plurality of radially extending pegs 85. A continuous strand 86 is projected or otherwise delivered along a line intersecting the path of movement of the pegs 85 at one side of the shaft 84. As each peg 85 crosses the path of the strand 86 it catches a loop of the strand forming a plurality of depending loops 87, 88, 89 and 90 which gradually are thrown outwardly by the centrifugal force resulting from the rotation of the peg spinner 82. At a location determined by the weight of the loops, and the speed of rotation of the peg spinner 82, each loop hooked over one of the pegs 85 finally is thrown off its peg 85 as shown by the loops indicated by the reference characters 91 and 92 in Fig. 10.

At this point in the operation there exists what approximates a "standing wave," originating at the peg 85 which has just thrown off its loop and extending through the air until the loops strike some form of arresting or accumulating device. In Fig. 10 the arresting or accumulating device is indicated as a foraminous belt 93 passing over a suction box 94. The loops 91 and 92 in Fig. 10 are in air en route to the belt 93. Upon striking the belt 93 the loops pile up upon themselves forming configurations generally similar to those indicated at the area included in the bracket numbered 95 in Fig. 10 and they are compacted upon the belt 93 by the action of the suction box 94.

A false twister 96 is located at a suitable distance from the belt 93 at a point beyond the suction box 94. The false twister 96 of Fig. 10 is merely illustrative and any one of the well known false twisters may be employed. The false twister 96 of Fig. 10 comprises a rotor having an axial entrance neck 98 and a laterally displaced exit opening 99. The rotor 97 is driven by a belt 100 engaged in a pulley 101.

The loops and doublings of strand accumulated on the belt 93 become entangled with each other to an extent greater than that illustrated in Fig. 10. An operator engages several of the loops and doublings just after they have passed the suction box 94 and pulls them laterally off the belt 93 and through the false twister 96. This may be done by use of a hook or similar instrument or tying a mass of strand to the end of the continuous pulling strand which is led through the twister 96. By applying pulling force to the end of the material extending out of the false twister 96, tractive force is applied to the mass extending from the twister 96 to the belt 93. The action of the twister 96 twists this mass upon itself and, in a sense, rolls up the loops and swirls as they are carried up to the line of departure by the belt 93, at the same time pulling them off laterally. As a result of this combined pulling and twisting movement the swirls, loops and doublings of strand are pulled off the belt 93 forming first a loosely integrated mass 102 and then, after leaving the false twister 96, a more tightly integrated, generally roving-like mass 103.

It is to be appreciated that the spacing of the various elements illustrated in Fig. 10 is not accurately depicted therein because of limitations of illustration and that the distances between the elements will depend upon many characteristics of the material being handled and the relative speeds of the functioning apparatus. Again, the nominal number of strands at any cross sectional point along the finished roving 103 is equal to the ratio between the lineal speeds of the roving 103 and the original driving strand 86.

The apparatus illustrated in Fig. 11 for carrying out a process according to the invention is a modification of the apparatus shown in Fig. 10. In operating according to Fig. 11 a driving strand 104 is projected downwardly into the path of movement of a plurality of pegs 105 that are carried on a belt 106 which is driven by a pair of sheaves 107. As is the case with the structure of Fig. 10 the pegs 105 engage the strand 104 at spaced intervals causing the strand 104 to form in depending loops 108 and 109. The loops 109 formed between each adjacent pair of pegs 105 are carried along until a peg 105 is swung around the sheave 107 at the delivery end of the belt 106. The sudden centrifugal force resulting from the swing of that peg 105, throws that portion of the strand 104 engaged by that peg 105 outwardly and away from its peg.

A trough 110 is located so as to receive the loops 109 as they fly off their pegs 105. The reception end of the trough 110 is perforated and a suction box 111 is provided to draw air downwardly through the perforations to compact the loops in the trough 110. It will be observed in Fig. 11 that the trough 110 is perforated for only a short distance along its length. The remaining surface of the trough 110 is smooth and imperforate.

The loops formed in the trough 110 are drawn axially of the trough by engagement with an instrument or a drawing cord or strand and led to twisting and pulling mechanisms so that both a twist and a longitudinal pull are applied to the loops. It will be observed in Fig. 11 that the twisting action carries back along the trough 110 to the edge of the perforate sections so that the loops and doublings of strand are twisted upon themselves as they are drawn along.

The result of operations according to Fig. 11 is similar to that according to Fig. 10 and in turn a roving 112 produced according to Fig. 10 is substantially indistinguishable from the rovings produced according to the earlier illustrations of the invention.

The process of the invention in intermittently slowing down spaced portions of a continuously projected strand or in momentarily stopping such portions to cause loops and doublings of strand, has utility not only for the production of roving-like masses or cords, ropes, etc., produced from such masses, but also in slowing up a continuously produced, high speed strand for other purposes.

In Fig. 12 there is illustrated the application of a process according to the invention for the preparation of reinforced, multi-ply sheet material. In Fig. 12 a continuous strand 113 is linearly projected along a path to engage a plurality of radially extending pegs 114 carried by a disk 115 of a peg spinner 116. The disk 115 is rotated by a shaft 117. As was the case in the operation according to Fig. 10 the strand 113 is caught by the pegs 114 forming loops 118 and 119 therebetween. Centrifugal force acting upon the loops 119 flares them outwardly and finally throws them off their pegs 114. In Fig. 12 a loop 120 is shown just at the point of departure from its peg 114. Again, as is the case with the process as illustrated in Figs. 10 and 11 what might be termed a "standing wave" extends downwardly and away from the peg spinner 116.

A web 121 of sheet material, for example, paper, is provided on a roller 122 and an adhesive applying mechanism 123 coats the upper surface of the web 121 with a suitable adhesive. In the fabrication of reinforced paper for moistureproof packaging, for example, the adhesive applied might be asphalt or it might be a suitable resinous adhesive having sufficient strength both to adhere the plies together and being substantially waterproof.

The web 121 is carried along in such relationship to the peg spinner 116 that the loops 120 which are thrown off the pegs 114 fall upon the web 121 in generally transversely extending loops and swirls generally as illustrated in Fig. 12. The web 121 is carried along and plied with a second, covering web 124 by a pair of pressure rollers 125 to form a multi-ply reinforced sheet material 126.

As is the case with the earlier illustrations of the process embodying the invention, a high speed single strand 113 is slowed down by doubling it upon itself and, therefore, is directly employable in an operation formerly requiring that the strand first be packaged and then unwound and subsequently handled in order to place it on the paper to be reinforced. Again, spaced portions of the continuously produced strand are momentarily delayed allowing the intervening portions of the continuously produced strand to catch up with, or double up upon, the delayed sections. The timing of the rotary peg spinner and the feeding of the web to be reinforced are correlated with the linear speed of the strand 113 to determine the spacing and degree of overlapping of the loops and swirls of strand upon the web 121.

In the apparatuses so far described on which the process of the invention can be carried out and embodying rotary means for delaying the spaced portions of the continuously fed strand, the delaying means have been located near the perimeters of the structure. In the apparatus disclosed in Fig. 13 and on which the method of the invention is illustrated as being carried out, the structure is provided with inwardly extending strand interrupting means.

Figure 13:
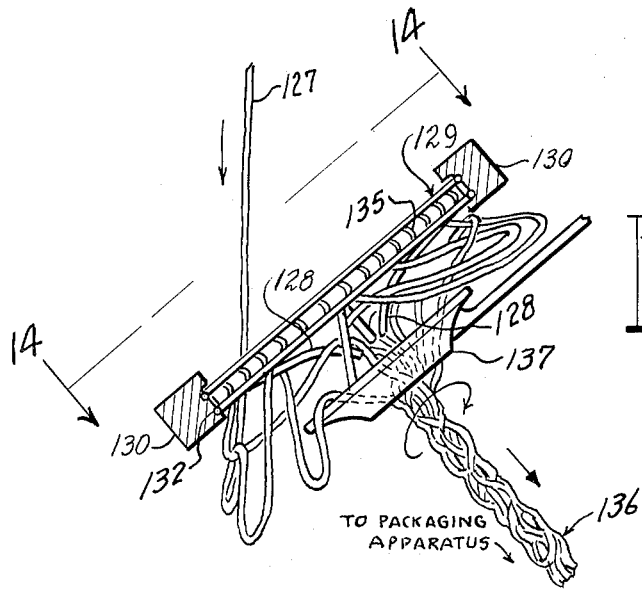
Fig. 13 is a somewhat schematic view in side elevation of yet another form of apparatus on which a process embodying the invention may be carried out.
Figure 15:
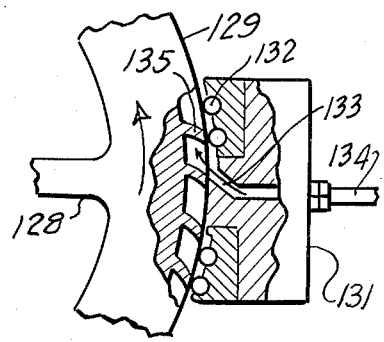
Fig. 15 is a fragmentary enlarged view of a portion of the mechanism shown in Fig. 14.
Figure 14:
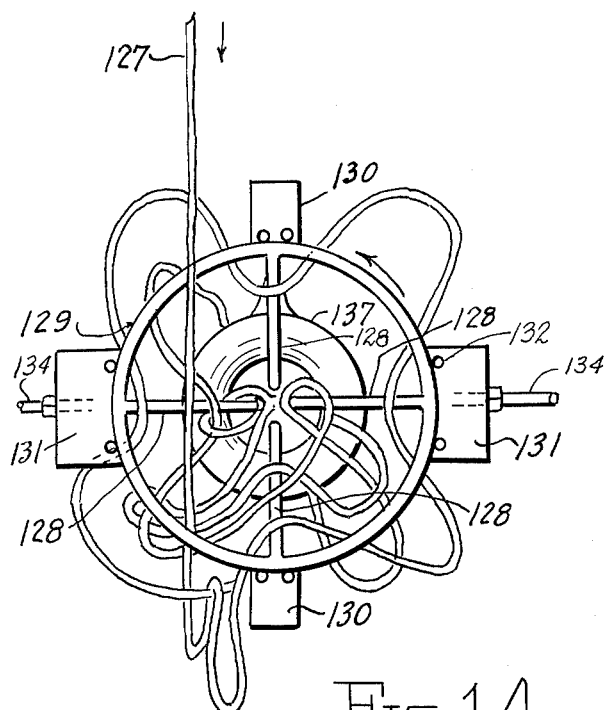
Fig. 14 is a view in elevation taken substantially from the position indicated by the line 14—14 of Fig. 13.

In Figs. 13 and 14 a projected strand 127 follows a path which intersects the path of four inwardly directed spoke-like pins 128 carried by a wheel 129 which is mounted for rotation in a plurality of bearing blocks 130 and 131. Each of the bearing blocks 130 and 131 has a series of bearing balls 132 (see also Fig. 15) which roll on the periphery of the wheel 129 and support the wheel 129 for rotary motion. The bearing blocks 131 also are provided with air jets 133 connected to air lines 134 and directed angularly inwardly toward the periphery of the wheel 129. The rim of the wheel 129 is grooved and a plurality of vanes 135 are located in the groove to trap air jetted from the air jets 133 and spin the wheel 129 in the bearing blocks 130 and 131.

The spokes 128 extend inwardly from the rim of the wheel 129 and are bent slightly to define a generally circular opening at the center of the wheel 129, the spokes 128 all extending toward the same side of the wheel 129 and terminating at equal distances from the axis of the wheel 129.

When the wheel 129 is spinning, the driving strand 127 is intermittently engaged at spaced distances along its length by the spokes 128. In common with the earlier described modifications of structure for performing the method of the invention, each of the spokes 128 laterally displaces the strand 127 and catches a loop of strand thereon. As the wheel 129 continues to rotate, the driving strand 127 forms a multiple number of loops on the spokes 128 and on previously formed loops. By means similar to those already described with respect to the other modifications of structure, an operator draws the loops radially inwardly toward the curved ends of the spokes 128 and pulls them axially away from the wheel 129. The rotary action of the wheel 129 and the spokes 128 in carrying the loops around causes them to entangle, intertwine and twist together so that the mass of doublings and loops pulled away is in the form of a roving 136 substantially identical to those formed on other apparatuses on which the invention can be carried out.

The grouping together of the loops and doublings of strand may in some cases be facilitated by the presence of a gathering ring 137 on the exit side of the wheel 129 to help gather the loops and doublings en route to their formation into the roving 136.

Figure 16:
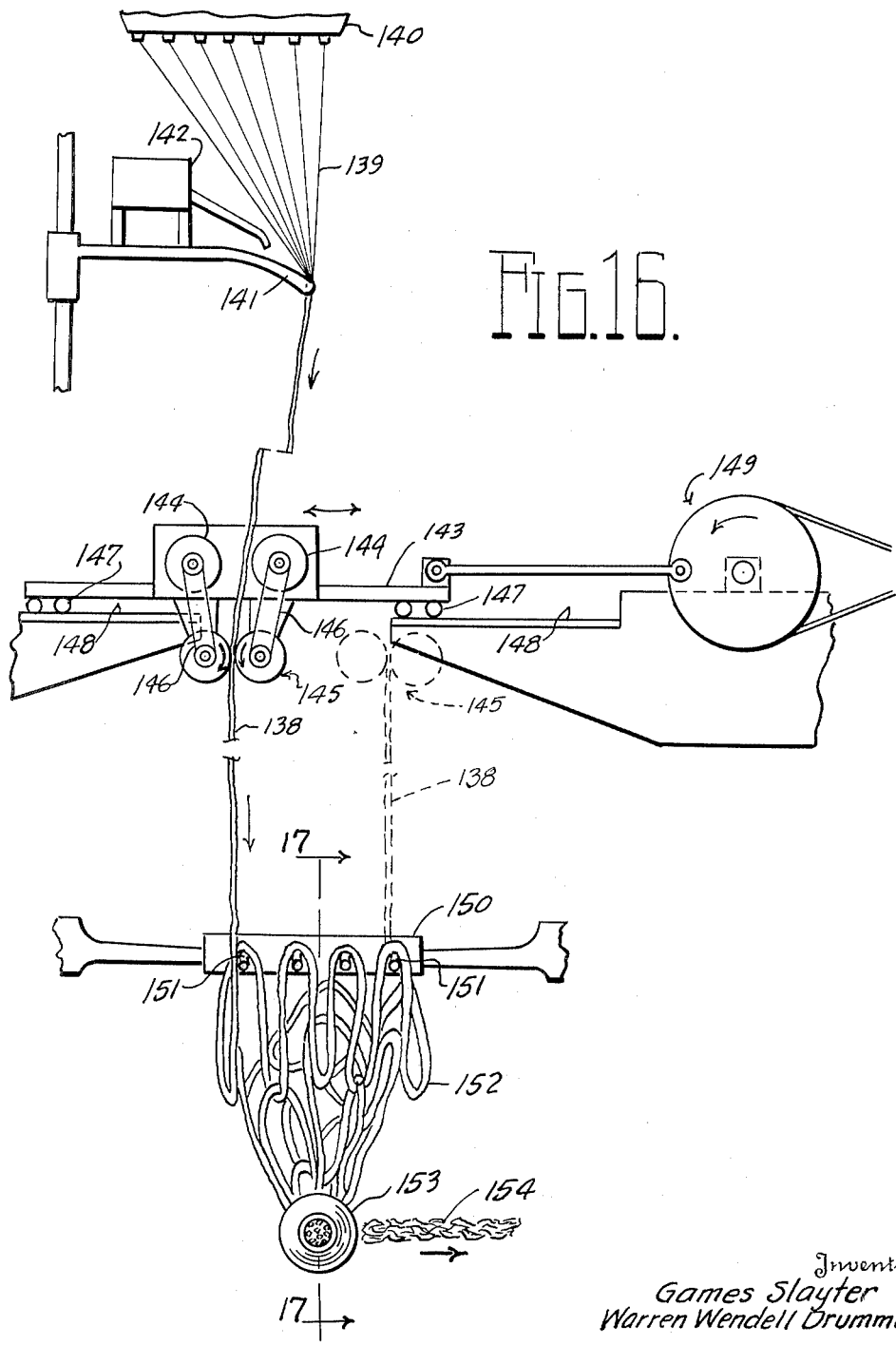
Fig. 16 is a view similar to Fig. 1 but illustrating modified apparatus for carrying out the process of the invention.

Figs. 16 and 17 illustrate another approach to the practice of the method of the invention wherein the strand interrupting means are held stationary and the strand pathway is changed so that the strand repeatedly encounters interrupting means at spaced distances along its length to be formed into loops and doublings in the same manner.

In Fig. 17 a strand 138 is shown as being formed from a plurality of individual fibers 139 which are drawn from orifices in the bottom of a molten glass supply tank 140. The fibers are grouped together by a guide 141 and may be coated with a suitable material fed to the guide 141 from a supply tank 142.

Located at some distance below the guide 141 there is a carriage 143 which supports a pair of motors 144 each of which drives one of a pair of pulling wheels 145 through the medium of a belt 146. The strand 138 is led downwardly between the peripheries of the pulling wheels 145 and, as in the structure illustrated in Fig. 1, is projected from the pulling wheels 145 at a very high speed and along a substantially linear path.

The carriage 143 is mounted by rollers or wheels 147 for reciprocation on a pair of tracks 148 and may be reciprocated in a direction transverse to the axes of the pulling wheels 145 by a crank and link generally indicated at 149.

A peg holder 150 is fixedly positioned beneath the pulling wheels 145 and carries a plurality of horizontally extending downwardly bent pegs 151. As the carriage 143 traverses its path above the pegs 151 the driving strand 138 is engaged by the pegs 151 at spaced portions. This causes the formation of depending loops 152 similar to those formed in the operations previously described. The depending portions of the loops 152 are engaged and drawn downwardly and possibly forwardly into the larger end of a gathering funnel 153. The mass of tangled loopings of strand is led from the funnel 153 to twisting and packaging mechanisms which place a constant tension on the intertwined and tangled mass forming it into a roving 154 substantially identical to those formed on the apparatuses of the earlier figures.

It may be observed in Fig. 17 particularly that, because of the action of gravity on the loops 152 immediately after their formation, they may tend to hand downwardly rather than being swung forwardly into entangled relationships with other loops and into the gathering funnel 153. This may be avoided by having the axis of the funnel 153 parallel to the path of the strand 138 or an air jet 155 may be provided for entangling the loops and doublings of strand en route to the gathering funnel 153.

Figs. 18 and 19 illustrate another way of varying the path of the driving strand to cause it to form loops or doublings upon itself on a stationary interrupting means. In these figures there is shown a driving strand 156 which is led through a rotary off-set spinner 157. The spinner 157 may be driven by a belt 158 engaged in its pulley 159 and journalled for rotation, for example, in a bearing bracket 160. The spinner 157 is slightly angular so that when the strand 156 exists from the spinner 157 it describes a long helical path.

A stationary ring 161 having inwardly directed, bent, spoke-like pegs 162 is positioned substantially coaxially with the entrance side of the spinner 157, i. e., along the path of the strand 156. As the driving strand 156 is projected in its helical pathway, spaced portions engage the pegs 162, being interrupted and allowing the intervening portion of the strand 156 to pass the engaged portions, forming depending loops 163 which become entangled and entrained with each other in the manner already described. By longitudinally pulling the entangled loopings through an axial opening between the ends of the bent pegs 162 and leading them to constant speed twisting and packaging mechanisms, these loops 163 are entwined together to form a roving-like mass 164.

In further illustration of the process embodying the invention the apparatus of Fig. 20 may be operated in accordance with the process of the invention for the production of a twisted roving-like mass 165 substantially identical to the roving-like masses produced according to the earlier figures but through a variation in the process of the invention.

In the structures illustrated in Figs. 1–9 and in Figs. 13–19, the loops and doublings of the projected strand are removed from the means upon which they are accumulated through additional mechanisms which may include apparatuses for twisting the strand doublings together. In contrast, in the apparatuses of Figs. 10–12 and Figs. 20–24, the doublings of strands are removed from the first accumulating means by the forces created by the operation of that means itself.

In Fig. 20 a pair of pulling wheels 166 is shown as drivingly engaging a strand 167 similar to the strands described in connection with the other figures. The pulling wheels 166 project the strand 167 downwardly into the path of movement of a plurality of bent pins 168 mounted upon a generally horizontal disk 169 which is rotated at high speed upon its shaft 170. As each of the pins 168 crosses the generally defined path of the strand 167 it engages the strand 167 and retards that portion of the strand 167 which it contacts. Since the strand 167 continues to feed, loops 171 are repeatedly formed between that one of the pins 168 first engaged and a following pin 168.

Due to the high speed of the rotation of the disk 169 and its pins 168, the loops or doublings 171 do not remain on the pins 168 for more than a brief instant, being thrown off the pins 168 by centrifugal force. Because of the constancy of speed of the various elements involved and of the feeding speed of the strand 167, the successive loops 171 are substantially identical, are engaged at and thrown off at the same points and form what might be termed a "travelling wave" lying in a generally vertical plane as they are thrown outwardly away from the pins 168.

The loops 171 are aimed at and fall upon the surface of an upwardly open, funnel-shaped catcher 172. The catcher 172 is rotatably mounted in a bracket 173, for example, at a level below and slightly removed from the location of the disk 169 in such a position that the loops 171 thrown off the pins 168 fall upon the catcher 172. The catcher 172 is rotated by a driving belt 173' and has a hollow shaft 174 as its neck. As the loops 171 fall upon the upper face of the catcher 172 they are spread out generally horizontally and become entangled with each other in the manner illustrated in Fig. 22.

As in the case of the earlier disclosures, an operator may start the ends of some of the loops 171, which now lie upon the catcher 172, downwardly through its hollow shaft 175. As the loops 171 are pulled into the shaft 174 they entangle with each other in the manner already explained and are associated together in compacted form to result in the twisted roving-like mass 165 which is shown as being pulled downwardly by winding or packaging mechanisms not shown in the drawings.

In the various illustrative apparatuses described above on which the process of the invention may be carried out, the end products produced have been in themselves useful in the form in which produced. They also have been combination products wherein the individual strand is accumulated upon itself and removed from the accumulating means for the production of the finished combined product. In the apparatus disclosed in Figs. 23 and 24, however, the end objective is not a combined or finished product but the accumulation of the strand itself in such form as to permit its subsequent utility. By the practice of the instant invention the strand can be accumulated to form a dense compact package of continuous strand without the faults inherent in a wound package.

In Fig. 23 a continuously produced strand 175 is shown as being fed at a high lineal speed by a pair of coacting pulling wheels 176. In common with the operation as illustrated in Fig. 20, a disk 177 mounted upon a shaft 178 and carrying a plurality of downwardly and outwardly extending pins 179, is rotated at high speed so that its pins 179 cross the path of movement of the strand 175 interrupting it and delaying spaced portions thereof. Loops 180 formed upon the pins 179 and thrown therefrom by centrifugal force are substantially identical in formation, retention and discharge with the loops 171 of Fig. 20. The "travelling wave" formed by the progressively released loops 180, as in the illustration of Fig. 20, extends across an open space and lies generally in a vertical plane.

A packaging tub 181 is mounted upon a spindle 182 below and at one side of the disk 177 and in line with the path of movement of the travelling wave formed by the progressively released loops 180. The drum 181 is generally cylindrical in shape being open at its top and having sufficient diameter to allow the travelling loops 180 to enter the drum and impinge upon its inner vertical walls. The spindle 182 is rotatably mounted in a support arm 183 and driven by a belt 184 so that the lineal speed of its inner wall is less than the lineal speed of delivery of the strand loops 180. As the wall of the drum 181 crosses the path of the strand loops 180, their momentum compacts them tightly against the wall and they are held in such position by the centrifugal force created by rotation of the drum 181. Thus an annular mass of strand is built up upon the inner wall of the drum 181 being densified by the combination of its own momentum on striking the drum 181 and the centrifugal force created therein. A dense but untangled cake is formed on the inner wall of the drum 181 and, after the accumulation of a sufficient quantity of strand, may be removed from the drum 181 as an integral mass.

Because of the successive lay-up of the generally vertically extending loops 180 in helical layers, no portions of previously projected strand overlie portions of later projected strand. Unwinding, therefore, is not likely to cause snarls or tangles and because of the absence of package tightening tension, another cause of mishap in unwinding a strand also is eliminated.

According to the invention in any of its various ramifications as disclosed above, individual connected bights, loops or doublings are formed in a continuous, generally linearly fed strand by means of apparatus which at least delays progressively spaced portions of the continuously fed strand until the intervening portions approach, catch up with or pass the delayed portions. These bights or loopos may be held for a brief time and then almost immediately released for further accumulation or they may be held for a longer time to cause further entanglements in the formation of bights upon bights. The duration of holding of the progressively formed loops or bights and the manner of their release may be modified in accordance with the above explanations for the production of different types of finished products or the subsequent handling of the strand in different ways. In all cases, however, the speed of handling is substantially reduced beneath the speed of original lineal projection (in some instances, manufacture) by a ratio calculated according to the degree of doubling of the strand upon itself. Previously required steps of single strand packaging or accumulating, such as winding; the assembly of numbers of such individual strands together; and their simultaneously unwinding for the production of finished products, are eliminated according to the process as described in the claims below.

We claim:

1. A method for handling a continuous flexible strand that comprises feeding said strand longitudinally along a generally defined path leading to a working zone, interrupting the longitudinal movement of said strand by at least momentarily retarding progressively spaced portions of said strand as they enter said zone while continuing the feeding of said strand into said zone until the portions of said strand intermediate such retarded portions at least approach such retarded portions, thereby doubling said strand portions upon themselves and forming serially connected bights in said continuous strand and continuously removing such bights from such zone in generally the same order as their formation.

2. A method for handling a continuous flexible strand that comprises feeding said strand longitudinally along a generally defined path leading to a working zone, interrupting the longitudinal movement of said strand by laterally displacing progressively spaced portions of said strand as they enter said zone while continuing the feeding of said strand into said zone until the portions of said strand intermediate such retarded portions at least approach such retarded portions thereby doubling said strand portions upon themselves and forming serially connected bights in said continuous strand and continuously removing such bights from such zone in generally the same order as their formation.

3. A method for handling a continuous flexible strand that comprises feeding said strand at a constant linear speed longitudinally along a generally defined path leading to a working zone, interrupting the longitudinal movement of said strand by laterally displacing progressively spaced portions of said strand as they enter said zone while continuing the feeding of said strand into said zone until the portions of said strand intermediate such retarded portions pass such retarded portions thereby doubling said strand portions upon themselves and forming serially connected bights in said continuous strand and continuously removing such bights from such zone in generally the same order as their formation.

4. A method for handling a continuous flexible strand that comprises feeding said strand at a constant linear speed longitudinally along a generally defined path leading to a working zone, interrupting the longitudinal movement of said strand by laterally displacing progressively spaced portions of said strand as they enter said zone while continuing the feeding of said strand into said zone until the portions of said strand intermediate such retarded portions pass such retarded portions thereby doubling said strand portions upon themselves and forming serially connected bights in said continuous strand and continuously removing such bights from such zone in generally the same order as their formation at a constant speed related to the speed of said strand in ratio to the degree of doubling of said strand.

5. A method for handling a continuous flexible strand that comprises feeding said strand at a constant linear speed longitudinally along a generally defined path leading to a working zone, interrupting the longitudinal movement of said strand by repeatedly crossing the path of said strand with spaced strand engaging means as said strand enters said zone while continuing the feeding of said strand into said zone between said strand engaging means, the portions of said strand intermediate such engaged portions extending therebetween in doubled, serially connected bights in said continuous strand, and continuously removing such bights from said strand engaging means in generally the same order as their formation thereon.

6. A method for handling a continuous flexible strand that comprises feeding said strand at a constant linear speed longitudinally along a generally defined path leading to a working zone, interrupting the longitudinal movement of said strand by repeatedly crossing the path of said strand with spaced strand engaging means as said strand enters said zone while continuing the feeding of said strand into said zone between said strand engaging means, the portions of said strand intermediate such engaged portions extending therebetween in doubled, serially connected bights in said continuous strand, continuing the feeding of said strand into said zone and engaging random portions thereof with bights previously formed therefrom for forming additional bights therein and continuously removing such bights from said strand engaging means in generally the same order as their formation thereon and at a speed related to the speed of said strand in ratio to the degree of doubling of said strand.

7. A method for handling a continuous flexible strand that comprises feeding said strand at a constant linear speed longitudinally along a generally defined path leading to a working zone, moving spaced strand engaging elements relative to and across the path of said strand for catching loops of strand on each of said elements, removing said loops from said elements and delivering said loops of strand for use at a speed related to the speed of movement of said strand in ratio to the degree of doubling of said strand.

8. A method for handling a continuous flexible strand that comprises feeding said strand at a constant linear speed longitudinally along a controlled path, progressively engaging said strand at spaced points therealong while continuing the longitudinal feeding of said strand between engagements and forming bights in said strand at such engagement points, progressively releasing said bights as further bights are formed thereon and delivering said bights into a generally oriented pattern.

9. A method for handling a continuous flexible strand that comprises projecting said strand at a high linear speed along a controlled path and onto a series of transversely extending laterally spaced projections, effecting relative lateral movement between said projections and the path of said strand, continuing the projection of said strand and the relative movement while concomitantly moving the bights in said strand that are formed on said projections off said projections.

10. A method for handling a continuous flexible strand that comprises projecting said strand at a high linear speed along a controlled path and onto a series of transversely extending laterally spaced projections, effecting relative lateral movement between said projections and the path of said strand thereby forming bights in said strand over said projections and between said projections and over portions of said strand previously formed into bights, progressively sliding such bights of said projections and orienting said bights into generally parallel compacted relation.

11. A method for handling a continuous flexible strand that comprises feeding said strand at a constant linear speed longitudinally along a generally defined path leading to a working zone, interrupting the longitudinal movement of said strand by repeatedly crossing the path of said strand with strand engaging means as said strand enters said zone while continuing the feeding of said strand into said zone past said strand engaging means, the portions of said strand intermediate such engaged portions extending therebetween in doubled, serially connected bights in said continuous strand, and continuously removing such bights from said strand engaging means in generally the same order as their formation thereon.

12. A method for handling a continuous flexible strand that comprises feeding said strand at a constant linear speed longitudinally along a generally defined path leading to a working zone, interrupting the longitudinal movement of said strand by repeatedly crossing the path of said strand with strand engaging means as said strand enters said zone while continuing the feeding of said strand into said zone past said strand engaging means, the portions of said strand intermediate such engaged portions extending therebetween in doubled, serially connected bights in said continuous strand, and individually and continuously removing such bights from said strand engaging means in generally the same order as their formation thereon.

13. A method for handling a continuous flexible strand that comprises feeding said strand at a constant linear speed longitudinally along a generally defined path leading to a working zone, moving at least one thin, pin-like strand engaging element repeatedly across the path of said strand for catching a loop of strand on said element upon each crossing of such path, removing said loops from said element and delivering said loops of strand for use at a speed related to the speed of movement of said strand in ratio to the degree of doubling of said strand.

14. A method for handling a continuous flexible strand that comprises feeding said strand at a constant linear speed longitudinally along a generally defined path leading to a working zone, moving at least one thin, pin-like strand engaging element repeatedly across the path of said strand for catching a loop of strand on said element upon each crossing of such path, removing said loops from said element, delivering said loops of strand for use at a speed related to the speed of movement of said strand in ratio to the degree of doubling of said strand along a second defined path leading from said working zone, moving a planar surface along a path intersecting said second path at a constant speed and progressively catching said loops on said surface.

15. A method for handling a continuous flexible strand that comprises feeding said strand at a constant linear speed longitudinally along a generally defined path leading to a working zone, moving at least one thin, pin-like strand engaging element repeatedly across the path of said strand for catching a loop of strand on said element upon each crossing of such path, removing said loops from said element, delivering said loops of strand for use at a speed related to the speed of movement of said strand in ratio to the degree of doubling of said strand along a second defined path leading from said working zone, moving a continuous planar web of sheet material along a generally horizontal path intersecting said second path at a speed such that said loops are progressively deposited thereon.

16. A method for producing a product comprising a multifilament glass fiber strand in looped relationship, said method comprising continuously attenuating a multifilament strand from a supply of molten glass and projecting said strand at a constant linear speed longitudinally along a generally defined path leading to a working zone, interrupting the longitudinal movement of said strand by repeatedly crossing the path of said strand with spaced strand engaging means as said strand enters said zone while continuing the feeding of said strand into said zone between said strand engaging means, the portions of said strand intermediate such engaged portions extending therebetween in doubled, serially connected bights in said continuous strand, and continuously removing such bights from said strand engaging means in generally the same order as their formation thereon and at a speed related to the speed of said strand in ratio to the degree of doubling of said strand.

17. A method for producing a glass fiber strand reinforced sheet comprising, continuously attenuating a multifilament strand from a supply of molten glass and projecting said strand at a constant linear speed longitudinally along a generally defined path leading to a working zone, moving at least one thin, pin-like strand engaging element repeatedly across the path of said strand for catching a loop of strand on said element upon each crossing of such path, removing said loops from said element, delivering said loops of strand for use at a speed related to the speed of movement of said strand in ratio to the degree of doubling of said strand along a second defined path leading from said working zone, and moving a continuous planar web of sheet material along a generally horizontal path intersecting said second path at a speed such that said loops are progressively deposited thereon.

References Cited in the file of this patent

UNITED STATES PATENTS

| | | |
|---|---|---|
| 796,740 | Linkmeyer | Aug. 8, 1905 |
| 2,604,687 | Broden | July 29, 1952 |

FOREIGN PATENTS

| | | |
|---|---|---|
| 420,085 | France | Nov. 14, 1910 |